United States Patent [19]
Burn

[11] 3,902,102
[45] Aug. 26, 1975

[54] CERAMIC CAPACITOR WITH BASE METAL ELECTRODES

[75] Inventor: Ian Burn, Williamstown, Mass.

[73] Assignee: Sprague Electric Company, North Adams, Mass.

[22] Filed: Apr. 1, 1974

[21] Appl. No.: 457,042

[52] U.S. Cl. .................. 317/258; 106/1; 252/513; 317/261
[51] Int. Cl.² ........................................ H01G 1/01
[58] Field of Search .......... 317/261, 258; 252/513, 252/514; 106/1

[56] References Cited
UNITED STATES PATENTS

| | | | |
|---|---|---|---|
| 3,021,589 | 2/1962 | Weller | 317/261 X |
| 3,277,020 | 10/1966 | Janakirama-Rao | 252/514 |
| 3,379,942 | 4/1968 | Davis | 317/258 |
| 3,544,330 | 12/1970 | Hoffman | 317/258 |
| 3,647,532 | 3/1972 | Friedman | 252/513 |

Primary Examiner—E. A. Goldberg
Attorney, Agent, or Firm—Connolly and Hutz

[57] ABSTRACT

A ceramic dielectric body, resistant to reduction in atmospheres of low oxygen content, has terminations comprising a sponge like matrix of base metal particles bound by an interspersed matrix of a glass that is also resistant to reduction, as for example, the barium alumino borate glasses. A method for making the capacitor comprises prefiring the ceramic body in air or other atmosphere, depositing an ink composed of base metal particles and glass frit, an organic binder and firing in an atmosphere of low oxygen content.

10 Claims, 4 Drawing Figures

CERAMIC CAPACITOR WITH BASE METAL ELECTRODES

BACKGROUND OF THE INVENTION

The present invention relates to ceramic capacitors and more particularly to such capacitors having base metal electrodes. Such monolithic capacitors are known having a non-reducible ceramic body and having base-metal film electrodes that are formed by applying a paste containing base-metal particles and an organic binder that is subsequently fired in an atmosphere of low oxygen content.

It is desirable to make contact to the electrodes as terminals by soldering or otherwise connecting lead wires thereto. The aforementioned metal film electrodes normally lack sufficient bonding strength to the underlying ceramic for use as terminals, and are too easily pulled off in further processing or in actual use.

The electrodes for many conventional ceramic capacitors, such as disc or tubular capacitors, are comprised of noble metals such as silver, being bound together and to the ceramic by a glass matrix. However, the cost of the noble metal electrode terminals represents a high percentage of the total capacitor costs. Base metals such as copper and nickel are generally one or two orders of magnitude less costly than noble metals but heretofore have not replaced noble metals for these applications because in the prior art, the following requirements could not be met simultaneously: (a) the base metal must be fired in an atmosphere of oxygen content below that at which the metal is oxidized, (b) the properties of the ceramic dielectric must not degrade when the electrodes are fired on, and (c) the glass frit must have satisfactory properties in firing atmospheres of low oxygen content.

It is therefore an object of the present invention to provide a low cost ceramic capacitor having strongly bonded base metal terminals.

It is a further object of this invention to provide a base metal terminal system having a reduction resistant glass matrix that upon firing in an atmosphere of low oxygen content will be chemically stable, will not adversely react with the adjacent ceramic or base metal, and will provide a strong bond to both.

It is a further object of this invention to combine a glass bound base metal terminal system with a ceramic dielectric body, both of which are resistant to reduction in a firing atmosphere of low oxygen content, so that the dielectric properties will not deteriorate when the electrodes are fired on.

It is yet a further object of this invention to provide a base-metal terminal system that may be fired in a reduced oxygen pressure atmosphere at a low temperature so as to minimize manufacturing costs.

SUMMARY OF THE INVENTION

A ceramic capacitor comprises a reduction resistant ceramic body and two solderable terminations, each adhering to a separate surface region of the body. Each termination comprises a sponge-like network of sintered base-metal particles and a reduction resistant glass filling the metal network. The glass is a barium borate that may contain significant quantities of alumina and wherein silica may be substituted for some of the borate and wherein other alkaline earth metals or alkali metals may be substituted for some of the barium. A method for producing the capacitor comprises applying to a fired reduction resistant ceramic body an ink composed essentially of base-metal particles, an organic binder, and a reduction resistant glass frit, and firing in an atmosphere of low oxygen content.

DESCRIPTION OF THE PREFERRED EMBODIMENTS

Figure 1:
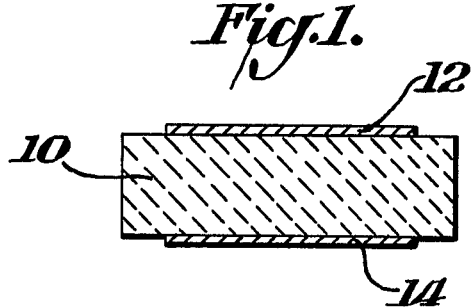
FIG. 1 shows a disc type capacitor according to the first preferred embodiment of this invention.

In FIG. 1 is shown a first preferred embodiment of a disc type ceramic dielectric capacitor of this invention. The body 10 is made of a ceramic that is resistant to reduction in a firing atmosphere of low oxygen content. The body 10 is in the form of a plate having two major surfaces opposite and parallel. The plate is preferably of a circular shape but may in general have any shape including rectangular. The electrodes 12 and 14 adhere to the opposite surfaces of the body 10. The electrodes 12 and 14 also serve as the terminations of the capacitor to which leads may be soldered or otherwise connected.

Figure 2:
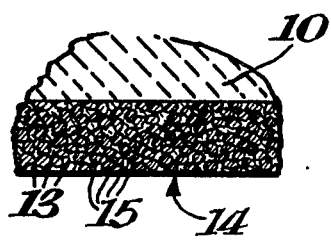
FIG. 2 shows an enlarged detail view of a portion of FIG. 1.

In FIG. 2 is shown an enlarged detail view of a region in FIG. 1 wherein the electrode termination 14 lies adjacent to the lower surface of the body 10. As illustrated in this view the terminations 12 and 14 are comprised of a sponge-like network of sintered base metal particles and a reduction resistant glass filling the sponge-like metal network. The glass serves to firmly bond the electrodes to the adjacent ceramic surface.

A capacitor of this invention is made by first compressing a non-reducing ceramic powder into a desired shape, according to well known methods, and "pre" firing the green compressed ceramic to form a dense refractory body having good dielectric properties. Alternative methods to compressing the powder, such as the conventional tape casting and punching, are also suitable. The non-reducing ceramic may in general be fired in an atmosphere of low oxygen content without seriously degrading the dielectric properties thereof, but it is preferable in the practice of the present invention to conduct this prefiring step in air, a major advantage being the lower cost associated with air firing.

A conductive ink is prepared composed essentially of particles of a base metal, a glass frit and an organic binder. A preferred formulation contains fine nickel or copper powder having a particle size of less than 325 mesh in diameter. A suitable binder is ethyl cellulose in terpineol and the glass is a barium borate to be more fully described below. The metal to glass ratio of between 4 and 5 to 1 based on true volume is appropriate. Higher metal to glass ratios, for example up to 9:1, can be used but the firing temperature must be increased accordingly.

The ink is applied by a normal screening process or by other suitable means to selected regions of the ceramic body surface, and is subsequently "post" fired in an atmosphere of low oxygen partial pressure.

Figure 4:
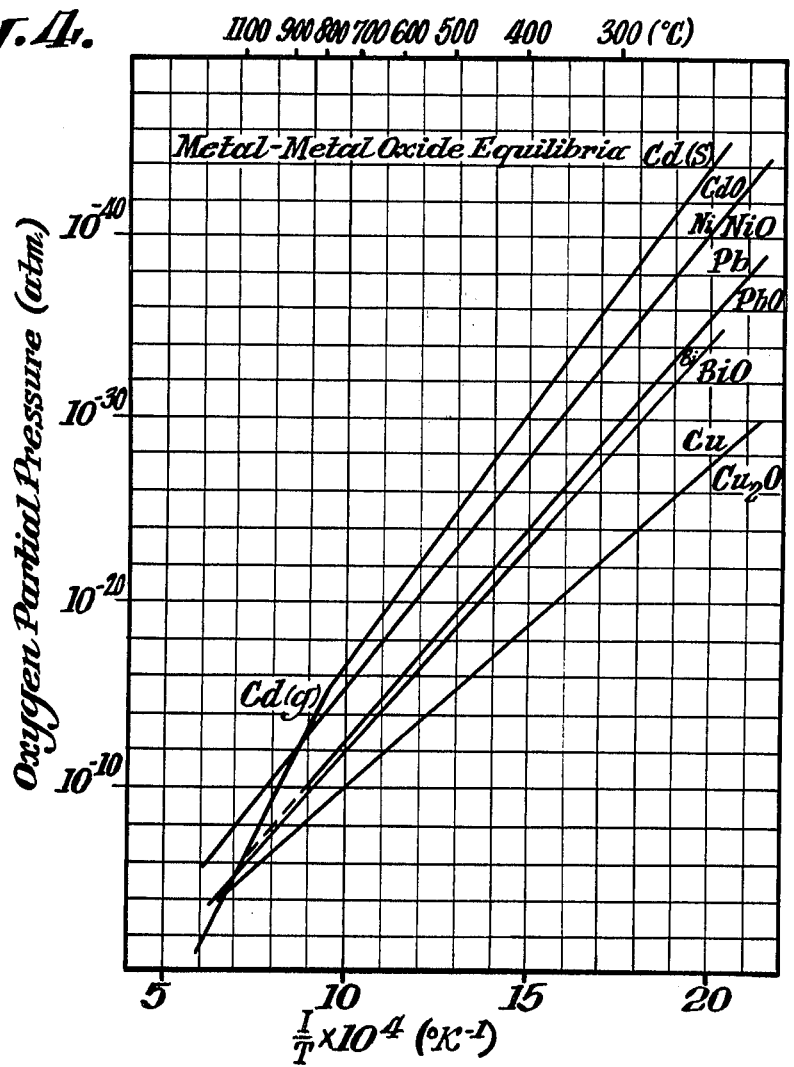
FIG. 4 shows a plot of oxygen partial pressures versus temperature defining metal/metal oxide equilibria for several metals.

Appropriate conditions at post firing are established to obtain melting of the glass without oxidation of the base metal. Temperature close to 900°C are the most suitable for firing base metal electrode pastes. Higher temperatures would involve increased furnace costs (e.g. power and belt life) and are not necessary. Nevertheless, temperatures slightly higher than those used for silver pastes ($\approx$750°C) are desirable if similar firing cycles are to be used, to ensure complete binder burn out and the removal of any oxide coating on the copper (or nickel). In general the range of firing temperatures suitable for making capacitors of this invention is from 700° to 1100°C, although a narrower range of 800° to 900°C is preferred. In FIG. 4 is shown a graph of oxygen partial pressures versus temperature for metal/-metal oxide equilibrium in the instance of nickel and another base metal, namely copper. (These data are reported in the U.S. Bureau of Mines Bulletin 542, 1954 by J. P. Coughlin.) It can be seen for example that to avoid oxidation of nickel, the post firing must be in an environment having oxygen pressures at least as low as $10^{-12}$ atmospheres of oxygen when the temperature is 875°C, or stated alternatively nickel must be fired at a temperature at least as high as 875°C in $10^{-12}$ atmospheres of oxygen. Likewise other equivalent sets of oxygen pressure and temperature are limiting for nickel as for example 1000°C and $10^{-10}$ atmospheres of oxygen. Similar sets of oxygen pressure and temperature are associated with copper as seen in FIG. 4 as well as with other base metals.

Oxygen partial pressures in the range required are obtained conveniently using $CO_2$—CO mixtures and can be predicted quite accurately from thermodynamic data. $CO_2$—CO ratios in the range 6:1 to 11:1 have been used mainly. The use of an oxygen monitor such as zirconia electrolyte probe permits a check on the atmosphere and is especially useful during binder burn-off. Such a monitor also makes the use of unbuffered gas systems practical (e.g. N or Ar, with or without air and small amounts of combustible gases — CO, $H_2$, $CH_4$, etc.), whereby oxygen content may be accurately controlled and gas costs could be negligible.

Dielectric ceramic materials that are resistant to reduction have been known for some time; for example dielectric materials having ingredient proportions $2BaTiO_3MnO$, or $4BaTiO_3MnO$, or $2BaTiO_3MgO$. An especially suitable reduction resistant ceramic material comprises an acceptor doped titanate, in which the large-cation/small-cation ratio is between 0.95 and 1.0. This latter material and its method of manufacture is made in accordance with the teachings of the copending application Ser. No. 130,692 filed Apr. 2, 1971 by Error, Burn and Maher.

A particular formulation of this ceramic that was used in prototype capacitors of this invention as further described hereinafter, is as follows:

|   | | |
|---|---|---|
|   | 90.2 (wt)% | barium titanate |
|   | 9.8 % | calcium zirconate |
| + | 0.5 % | barium carbonate |
|   | 0.24% | manganese carbonate |
|   | 0.15% | niobium oxide |

Discs 0.020 inch thick were pressed, pre-fired at 1400°C in air, and had a dielectric constant of about 9400.

As outlined earlier, a suitable glass must adhere firmly to the ceramic and must be chemically stable in a firing atmosphere of low oxygen content.

Included in FIG. 4 are data for metal oxides commonly present in glass frits used in silver pastes. It is clear in the case of nickel pastes that the use of glass frits containing Pb, Bi or Cd oxides should be avoided since atmospheres that adequately protect Ni from oxidation will reduce these oxides, leading to unstable glasses and high metal volatility. Although the use of such oxides for copper pastes is theoretically possible, as can be seen from the data in FIG. 4, the permissible range of oxygen partial pressures that would not reduce the oxides of Pb, Bi or Cd and not oxidize copper is very small. Of course acceptable results could possibly be obtained with pastes containing unstable glasses and/or by using non-equilibrium firing conditions but difficulties with reproducibility would no doubt be inherent to such a process. Consequently glasses based on more stable oxides are preferred.

Also, the glass bound electrode must make a low resistance contact to the dielectric, otherwise low capacitance and high a.c. losses will result. It is therefore clear that the glass must not form a metal free continuous glass film over the surface of the ceramic. Little is known about the nature of the interface between the glass bound electrode and the ceramic surface, but a simple calculation shows that, even for a relatively high permitivity glass ($K \approx 20$), a thin film 1 micron thick would reduce the capacitance of an 0.020 inch thick K-9000 disc by about 65%. It is possible that the glass bonds preferentially to the grain boundaries of the ceramic where glass forming impurities such as silica and alumina tend to concentrate. Such a situation would allow a metallic film to make good electrical contact to the high permittivity grains of the ceramic while being anchored to the grain boundaries which generally contribute little to the capacitance.

Finally, from the considerations of suitable firing conditions for base-metal electrodes, the glass must be capable of achieving the necessary low viscosities for wetting at the low firing temperatures that are most suitable for sintering the base metal in a non-oxidizing atmosphere.

No glass formulations have heretofore been identified as meeting all of these essential requirements.

In accordance with the principles of this invention, a suitable and preferred reduction resistant glass comprises a barium borate that may contain significant quantities of alumina and wherein silica may be substituted for some of the borate and wherein other alkaline earth metals may be substituted for some of the barium.

The particular ranges by weight percentage of the constituent oxides of barium, boron, and aluminum that form stable glasses and are therefore especially suitable for use in the electrode system of this invention have been shown to be BaO 9–61%, $Al_2O_3$ 0–35%, and $B_2O_3$ 24–83%; by C. Hirayama, Journal of The American Ceramic Society, 1961, vol. 44, No. 12, page 604. Hirayama also documents the closely related properties of all the alkaline earth alumino borate glasses. The aluminoborate or aluminoborosilicate glasses containing the alkaline earths (Ba, Sr, Ca, Mg) or zinc are stable under the required conditions, but those based mainly on barium oxide have the lowest softening temperature and are preferred. A barium aluminoborate composition ($4BaO.Al_2O_3.2B_2O_3$) which as a sag point close to 500°C has been found to give excellent results. Variants of this glass in which some of the $B_2O_3$ was replaced by $SiO_2(4BaO.Al_2O_3.SiO_2)$, or BaO partly replaced by an alkali metal oxide ($2BaO.Li_2O.Al_2O_3.B_2O_3$) also have acceptable properties. Partial replacement of BaO by other alkaline earth oxides or zinc oxide also produce suitable glasses. Alumina is not strictly essential in these glasses but generally improves chemical durability and inhibits devitrification.

In general, the reduction resistant barium borate glass of this invention comprises no less than 9% barium oxide and no less than 24% boric oxide. It preferably contains some alumina, but no more than 35% of the total glass composition. Substitution for up to 50% of the barium oxide with one or more of the other alkaline earth metal oxides or with one or more of the alkali metal oxides provides suitable glass compositions for use in capacitors of the present invention. Substitution for up to 90% of the boric oxide with silica also provides suitable glass. Substitution of not more than 50% of the barium oxide with zinc oxide is also appropriate. The above mentioned percentages are all given in mole percent.

Figure 3:
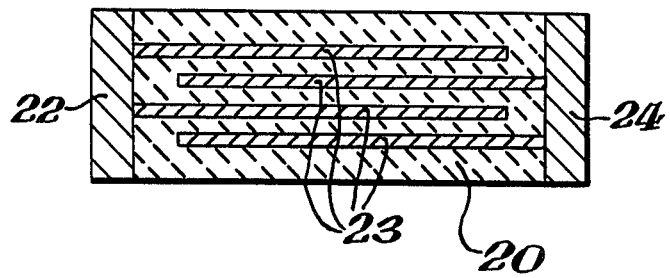
FIG. 3 shows a monolithic type capacitor according to the second preferred embodiment of this invention.

The glass bound base metal terminations of this invention are also especially well suited for use on monolithic ceramic capacitors wherein the ceramic body incorporates a plurality of metal film electrodes. In FIG. 3 is shown a second preferred embodiment wherein a monolithic ceramic capacitor comprises metal film electrodes 23 buried within a ceramic dielectric body 20 that is resistant to reduction. It is seen that alternate films extend to one side of the body and the other films extend to the opposite side of the body. An electrode termination 22 adheres to said one side and contacts said alternate electrode films while electrode termination 24 adheres to said opposite side and contacts said other electrode films. More generally, there may be two or more such electrode films buried within the body although four are shown in this particular case. As in the first preferred embodiment, the termination layers 22 and 24 are comprised of a composite material of sintered base metal particles and a glass that is resistant to reduction.

The electrode films 23 may be of a noble metal such as palladium, gold or silver as is well known in the monolithic ceramic capacitor art. On the other hand, the electrodes 23 may be of a base metal such as nickel or copper. In either case thin slips of dried but green reduction resistant ceramic material are prepared, and an ink containing metal particles is screen printed on two or more of the ceramic slips, the slips subsequently being stacked and fired to form the monolithic capacitor in a conventional fashion as is described in more detail for example by Hurley in U.S. Pat. No. 3,717,487 issued Feb. 20, 1973. However, in the case of the base metal electrode capacitor, the firing is necessarily carried out in an atmosphere of low oxygen content as described for example in the co-pending application Ser. No. 130,692.

The following examples will serve to illustrate the invention but are not to be regarded as limiting:

EXAMPLE I

A batch of glass having nominal composition $4BaO.Al_2O_3.2B_2O_3$ was prepared from 122.32 grams of barium nitrate, 18.25 grams of aluminum hydroxide, and 29.22 grams of boric acid. The powders were mixed in a vibratory mixer/mill and then fused in a platinum crucible at 1100°C. The glass was swirled occasionally in the crucible to help homogenization and then cast on a steel plate. The density of the glass was 3.96 grams per cubic centimeter. It was then pulverized to −200 mesh and ball-milled in isopropylalcohol using alumina balls to a particle size less than 5 microns.

To make the electrode paste, 1.76 grams of glass powder were added to 20.0 grams of copper powder of particle size −325 mesh, together with 3.0 grams of an 8% solution ethyl cellulose in terpineol. The metal/glass volume ratio was 5 to 1. The mixture was then blended with extra terpineol to obtain a paste of consistency suitable for screen printing.

The paste was applied as 0.5 inch diameter electrodes on 0.020 inch thick sintered ceramic discs having the composition described earlier. The electrodes were then fired in a controlled atmosphere furnace at a peak temperature of 900°C for one-half hour and a total cycle of 1 hour. Air was allowed to flow through the furnace until peak temperature was reached and then a 6:1 $CO_2$—$CO$ mixture was admitted to the furnace, reducing the oxygen partial pressure in the hot-zone to $10^{-15}$ atmospheres, as indicated by an in situ zirconia probe.

After the electrodes were fired, 0.025 inch diameter leads were attached by dip-soldering in a 60Sn-40Pb bath at approximately 230°C, using a non-activated rosin flux. When aged for 24 hours the capacitors had an average capacitance of 20,025 pf, D.F. of 1.5% using 0.5V signal voltage. When both leads were pulled in opposite directions (i.e. a peel test), up to 7 lbs. was required to damage the electrodes, the average being 4.7 lbs.

EXAMPLE II

To 50.0 grams of Ni powder of particle size −500 mesh were added 5.60 grams of the glass described in Example I, and a paste was made using ethyl cellulose and terpineol, as before. This paste which had a metal/glass volume ratio of 4 to 1 was put onto discs of the same ceramic as in Example I and also fired at 900°C with the same soak time and cycle. However, a $CO_2$—$CO$ mixture of 11:1 was used for the complete firing cycle. During the soak period the oxygen partial pressure was in the range $10^{-14}$–$10^{-15}$ atmospheres.

Leads were soldered onto the electrodes as in Example I and, after 24 h aging, capacitance was 19,800 pf, DF was 3.7%, and the average peel strength was 4.5 lbs.

EXAMPLE III

A glass having a nominal composition $4BaO.Al_2O_3.B_2O_3.SiO_2$ was prepared as in Example I from 123.69 grams of barium nitrate, 18.45 grams of aluminum hydroxide, 14.63 grams of boric acid and 7.11 grams of silica; a temperature of 1200°C being used for fusing the mixture. The density of the glass when formed was 4.13 grams per cubic centimeter.

To 20.0 grams of the copper powder used in Example I was added 2.32 grams of glass powder, and a paste made as before. The metal/glass ratio being 4 to 1. Electrodes were screen printed on discs of the same ceramic used in Examples I and II, and were fired and soldered as in Example I. Average capacitance after aging was 16,750 pf, DF was 1.7% and average peel strength was 7.1 lbs.

EXAMPLE IV

A glass having the composition $2BaO.Li_2O.Al_2O_3.2B_2O_3$ was prepared from 90.33 grams of barium nitrate, 12.78 grams of lithium carbonate, 27.00 grams of aluminum hydroxide and 42.80 grams of boric acid by fusing at 1150°C. Density was 3.34 grams per cubic centimeter.

Using 20.0 grams of the same copper powder as in Example I, with 1.41 grams of glass powder for a 4 to 1 metal/glass ratio and the procedures of Example I, average capacitance after aging was 16,080 pf, DF was 3.8%, and average peel strength was 3.0 lbs.

EXAMPLE V

The copper electrode paste was applied to the ceramic discs and fired as in Example III except that a peak temperature of 800°C was used instead of 900°C. Leads were attached as before and average capacitance after aging was 17,200 pf, DF was 2.2%, and average peel strength was 5.1 lbs.

EXAMPLE VI

The procedure of Example III was used except that a peak temperature of 700° was used instead of 900°C. After aging, average capacitance was 16,900 pf, DF was 2.9% and average peel strength was approximately 1 lb.

EXAMPLE VII

A copper paste of the composition described in Example 3 was applied as electrode terminations to ceramic monolithic capacitors of the type described in the aforementioned application Ser. No. 130,692. The electrode terminations were fired at a peak temperature of 900°C for 15 minutes in a $CO_2-CO$ atmosphere of 11:1. The oxygen partial pressure during the soak period was approximately $10^{-15}$ atm. Leads were attached by dip-soldering as in the previous examples. After aging, capacitance was 1.0–1.1 $\mu F$, DF was 1.95%, and leakage current at 75V/mil was 0.03 $\mu A$. When the leads were pulled in opposite directions at right angles to the terminations (peel-test) an average of 3.1 lbs was required to pull off a lead.

EXAMPLE VIII

A nickel electrode paste was made by mixing 0.19 grams of the barium aluminoborate glass described in Example I with 6.55 grams of frit-less nickel paste containing 60% nickel powder and the rest ethyl cellulose in terpineol. The metal/glass ratio in the paste so formed was 9 to 1. The paste was applied as electrode terminations to monolithic capacitors as in Example VII and fired at 1100°C for 1 hour in a $CO_2-CO$ atmosphere of 19.4 to 1 producing an oxygen partial pressure of $10^{-10}$ atm $O_2$. Good bonding of the electrode terminations to the ceramic and excellent electrical contact with the electrodes were achieved.

What is claimed is:

1. The ceramic capacitor comprising a dielectric ceramic body, said body being of a reduction resistant ceramic dielectric material; and two solderable terminations each adhering to a separate surface region of said body, each said termination comprising a sponge-like network of sintered oxide-free base-metal particles and a reduction resistant type glass filling said sponge-like metal network, said base metal being selected from copper and nickel, said reduction resistant glass being a barium borate.

2. The capacitor of claim 1 wherein said body contains a plurality of metal electrode layers buried therein, said layers being mutually parallel and having a stacked geometry with the alternate of said layers extending to one face of said body and the remaining of said layers extending to the opposite face of said body, one of said terminations contacting said alternate electrode layers and said remaining electrode layers contacting the other of said terminations.

3. The capacitor of claim 2 wherein said metal electrode layers are of a base metal.

4. The capacitor of claim 1 wherein said reduction resistant type ceramic material is an acceptor doped titanate in which the large-cation/small-cation ratio is between 0.95 and 1.0.

5. The capacitor of claim 1 wherein said two terminations are positioned on opposite faces of said body and serve as the electrodes of said capacitor.

6. The capacitor of claim 1 wherein said glass is composed essentially of 24–83% $B_2O_3$, 9–61% BaO, and 0–35% $Al_2O_3$.

7. The capacitor of claim 6 wherein $SiO_2$ is substituted for up to 90 mole percent of said $B_2O_3$.

8. The capacitor of claim 6 wherein one or more of the alkaline earth metal oxides is substituted for up to 50 mole percent of said BaO.

9. The capacitor of claim 6 wherein one or more of the alkali metal oxides is substituted for up to 50 mole percent of said BaO.

10. The capacitor of claim 6 wherein ZnO is substituted for up to 50 mole percent of said BaO.

* * * * *